(12) United States Patent
Moore et al.

(10) Patent No.: US 7,827,776 B2
(45) Date of Patent: Nov. 9, 2010

(54) SYSTEM AND METHOD FOR SEPARATION AND CONTROL OF ENTRAINED GAS MIXTURE

(75) Inventors: Jack Douglas Moore, Chuluota, FL (US); Damien G. Teehan, St. Cloud, FL (US); Christopher J. Davila-Aponte, Winter Springs, FL (US)

(73) Assignee: Siemens Energy, Inc., Orlando, CA (US)

( * ) Notice: Subject to any disclaimer, the term of this patent is extended or adjusted under 35 U.S.C. 154(b) by 995 days.

(21) Appl. No.: 11/600,707

(22) Filed: Nov. 16, 2006

(65) Prior Publication Data
US 2008/0115483 A1   May 22, 2008

(51) Int. Cl.
*F02B 43/00* (2006.01)
*F02G 3/00* (2006.01)

(52) U.S. Cl. ............ 60/39.12; 60/781; 60/39.182; 60/39.464; 60/39.094; 60/39.53; 60/39.58; 60/39.59; 60/739

(58) Field of Classification Search ............... 60/781, 60/39.182, 39.464, 39.12, 39.094, 39.53, 60/39.58, 39.59, 739; 95/241, 261; 96/155, 96/157, 204, 206, 208, 216
See application file for complete search history.

(56) References Cited

U.S. PATENT DOCUMENTS

| | | | | |
|---|---|---|---|---|
| 5,345,756 | A | * | 9/1994 | Jahnke et al. ............ 60/781 |
| 7,328,587 | B2 | * | 2/2008 | Shaffer et al. .......... 62/228.1 |

* cited by examiner

*Primary Examiner*—Michael Cuff
*Assistant Examiner*—Craig Kim

(57) ABSTRACT

A power generation system. The exemplary system shown in FIGS. 1 and 2 includes a gas turbine (28), a gasifier (10) for generating gaseous fuel and a gas combustor (26) configured to receive the fuel and power the gas turbine (28). A drain collection and separation system (5) is positioned to collect gaseous fuel entrained in liquid and to separate the gaseous fuel from the liquid so the gaseous fuel can be cycled or disposed of separately from the liquid.

9 Claims, 2 Drawing Sheets

SYSTEM AND METHOD FOR SEPARATION AND CONTROL OF ENTRAINED GAS MIXTURE

FIELD OF THE INVENTION

The present invention relates generally to power generation systems, and more particularly, to systems using gas turbines.

BACKGROUND OF THE INVENTION

In the past, Natural Gas-fired Combined Cycle ("NGCC") systems have been a preferred choice for fossil-fueled electric generation. Recently, as demand and price for natural gas has increased, Integrated Gasification Combined Cycle ("IGCC") systems have become an economically attractive alternative for power generation. In IGCC systems, a carbonaceous fuel such as coal is converted to a synthetic gas fuel, termed syngas. This gas mixture is formed by partial oxidation of hydrocarbons at elevated temperatures. It predominantly comprises carbon monoxide and hydrogen, also including a variety of other constituents. The composition of syngas can vary considerably, depending on the carbonaceous source and the reaction conditions.

IGCC systems present an opportunity to deploy coal, an abundant resource, in an economical and clean manner, bringing improved efficiency and cost over conventional coal-burning steam turbine power generation as well as NGCC systems. The efficiency advantage in an IGCC system stems primarily from the combined cycle. Hot gas products, resulting from syngas combustion, exiting the gas turbine are used to elevate the temperature of water or steam. The resulting steam then undergoes a conventional Rankine cycle. With a typical gasification efficiency of about 80 percent and combined cycle efficiency (gas turbine and steam turbine) of about 58 percent, it is possible to achieve an overall efficiency of 46.4 percent. By way of comparison, the overall efficiency of a typical coal-burning steam turbine power plant is less than 45 percent.

Often syngas includes sulfides and nitrous oxides which are normally removed from the mixture prior to combustion in order to provide an environmentally clean exhaust gas from the combustion stage. To effect this removal, the syngas is sometimes cooled to near room temperature with heat recovery steam generators, so that sensible heat in the high temperature syngas is recovered by a heat exchange process, such as conversion of water into steam. Nonetheless, the form of syngas that enters the gas turbine is a toxic mixture. When used in a combined cycle system there may be concern that syngas will enter subsequent stages of the power system and cause risks of explosion or that toxic constituents may be introduced to materials that are vented to the atmosphere.

With syngas being a highly combustible material it is important to identify potential hazards posed in IGCC systems and find ways to improve the safe handling of this and other potentially hazardous gases in power generation systems.

BRIEF DESCRIPTION OF THE DRAWINGS

Features of the invention will be best understood when the following detailed description is read in conjunction with the accompanying drawings, wherein.

In accordance with common practice, the various described device features are not drawn to scale, but are drawn to emphasize specific features relevant to the invention. Like reference characters denote like elements throughout the figures and text.

DETAILED DESCRIPTION OF THE INVENTION

An exemplary application of the invention to a power generation system is now described with reference to a coal-based Integrated Gasification Combined Cycle (IGCC) power plant 100. Although the illustrated drain collection, gas separation and control system is configured for an IGCC application, the concepts apply to a variety of other systems wherein drainage of a liquid-gas mixture is desirable, particularly when there are safety or environmental concerns associated with entrained gases. In one form of the invention, entrained gas, forming a mixture with a liquid, e.g., predominantly water, is processed to separate the gas component so that the gas component can be disposed of separately from the liquid.

In one embodiment the invention provides a method for the separation of syngas from condensed liquids in lines directing fuel and steam to the manifold of a gas combustor. As syngas is highly flammable, its presence in the condensates can pose a significant fire or explosive risk when the condensates are drained. In addition, carbon monoxide, a primary constituent of syngas, is highly toxic. Further, the mixture of syngas and water may be corrosive such that it may be desirable to remove the syngas prior to further processing of the drain condensates. In this example there is a combined collection of liquids from both a steam injection system and a manifold to utilize one separator tank from which gas and liquid may be isolated prior to disposal.

Figure 1:
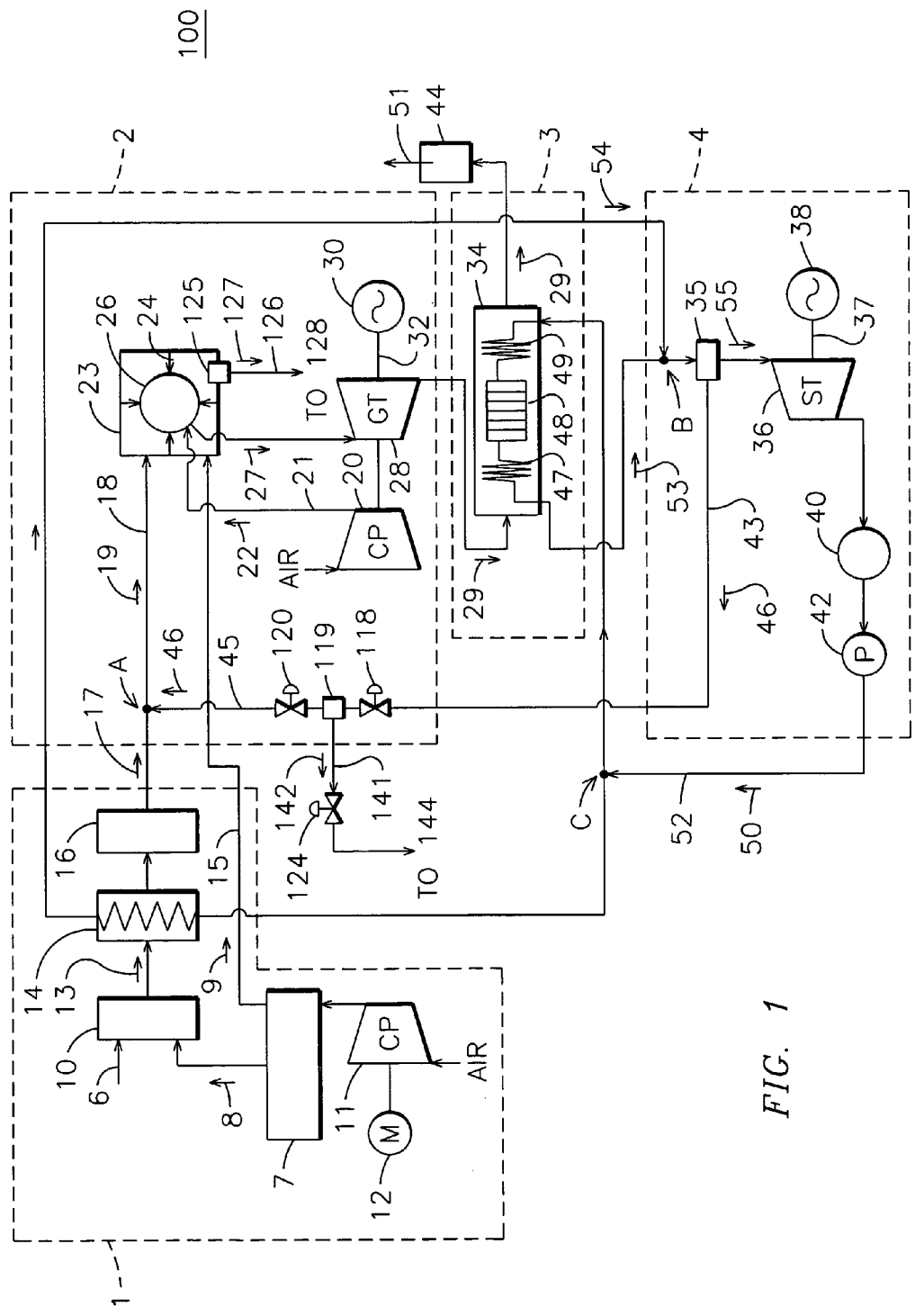
FIG. 1 illustrates components of a combined cycle power plant incorporating the invention.

Referring to FIG. 1, the IGCC system 100 comprises a gasification system 1, a gas turbine system 2, a heat recovery system 3, and a steam turbine system 4 each of which may be configured in a manner known in the art. In the gasifier system 1 a carbonaceous fuel 6, such as a coal slurry is provided to a gasifier 10. An air separation unit 7 is coupled to an air-compressor 11 driven by a motor 12 to provide a source of oxygen 8 to the gasifier 10. In the gasifier 10, the fuel 6 undergoes partial oxidation to generate CO and $H_2$. The reaction is exothermic, with hot syngas 13 exiting the gasifier, generally in the temperature range of about 2000° F.-2800° F. In order to meet air quality requirements, impurities such as sulfur, nitrous compounds, and dust are removed in a gas clean-up unit 16. An intermediate syngas cooler 14 reduces the syngas temperature before introduction to the gas clean-up unit 16. The cooler 14 receives relatively cool condensate feed water 50 from the steam turbine system 4 to recover the syngas heat. After removal of impurities the cleaned syngas 17 enters fuel line 18 and is mixed at Point A with steam 46, to obtain a desired heating value. The steam 46 travels from a steam chest 35 in the steam turbine system 4 through a steam line 43, which includes an injection line 45 connecting with the fuel line 18 at Point A. The mixture 19 of steam 46 and syngas 17 flows to a manifold section 23 for entry to the combustor 26. Oxygen-depleted air 9 from the air separation unit 7 may also be added to reduce flame temperature and $NO_x$ formation. Although the system 2 is illustrated as having a separate line 15 to deliver the oxygen-depleted air 9, in other designs the oxygen-depleted air 9 may be delivered to a supply line 21 carrying air 22 from a compressor 20 to the combustor 26. The compressed air 22 may be oxygen enriched.

The gas turbine system 2 includes the air-compressor 20, the combustor 26, a gas turbine 28, and an electrical generator 30. A rotator shaft 32 couples the gas turbine 28 to the compressor 20 and the generator 30. The fuel mixture 19 travels along the line 18 and enters the manifold section 23, passing through multiple ports 24 thereof and into the combustor 26 where it reacts with the compressed air 22 to produce a hot, pressurized gas 27 directed into the gas turbine 28. During steady state operation the gas turbine may rotate at 3600 RPM as the temperature of air 22 exiting the compressor 20 is excess of 260° C. (500° F.), at a pressure on the order of 700 kPa (100 psi).

In the gas turbine 28, the hot gas 27 expands, transferring power through the rotor shaft 32 to turn both the compressor 20 and the electrical generator 30. As a result of having been expanded in the turbine 28, expanded exhaust gas 29 exiting the turbine 28 is at a considerably lower temperature than the hot gas 27 entering the turbine 28. Nevertheless, with the turbine 28 operating at full load, the temperature of the expanded gas 29 is still relatively hot, typically in the range of 450° C.-600° C. (850° F.-1100° F.). The exhaust gas 29 is directed from the turbine 28 to the heat recovery system 3 for removal of sensible heat. After further cooling and expansion in the heat recovery system 3, the exhaust gas 29 is discharged to atmosphere via a stack 44. The heat recovery steam generator 34 of the heat recovery system 3 comprises a superheater 47, an evaporator 48 and an economizer 49. Condensate feed-water 50 is transferred from the steam turbine system 4 by a pump 42 for heat exchange in the HRSG 34. The feed water 50 first flows through the heat transfer tubes of the economizer 49, where its temperature is raised to near the boiling point. The heated feed water from the economizer 49 is then directed to the evaporator 48 where the feed water is converted into saturated steam, whose temperature is further elevated as it flows through the superheater 47 prior to entry into the steam chest 35. Steam 54 generated in the syngas cooler 14 is also directed to the steam chest 35. These sources are merged at Point B.

The steam turbine system 4 includes a steam turbine 36, which receives steam 55 from the steam chest 35, an electrical generator 38 coupled to receive power from the turbine 36 through a rotor shaft 37, a condenser 40 and a feed-water pump 42. Although the system 4 is illustrated as including the rotor shaft 37 to drive the electrical generator 38, in other designs the turbine 36 may be coupled to the shaft 32 to transfer power to the generator 30. After expansion, the turbine working steam 55 enters the condenser 40 for recycling as feed water 50. A portion of the feed water 50 is distributed to the syngas cooler 14 from a distribution Point C, while the remainder is directed back to the HRSG 34.

Figure 2:
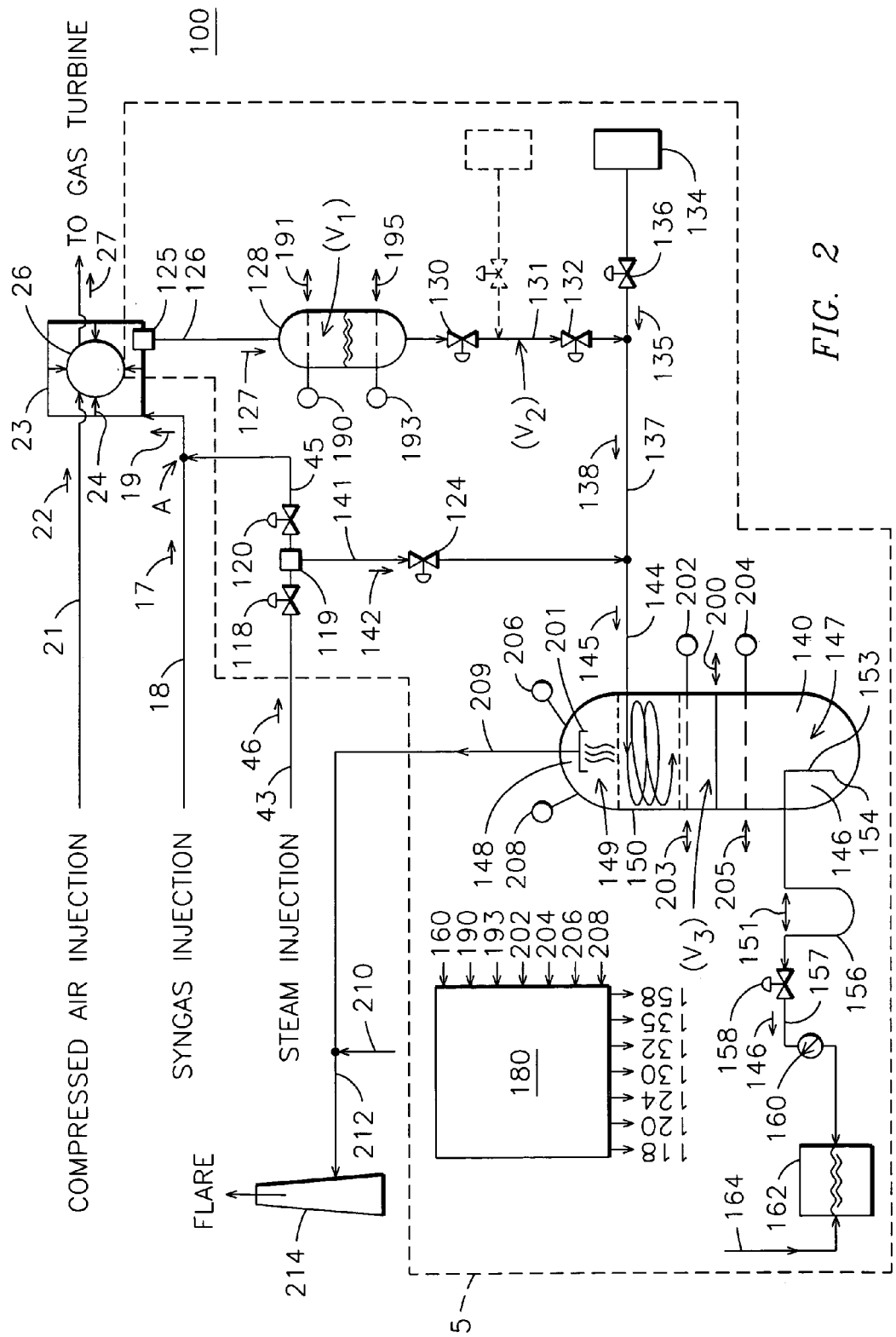
FIG. 2 illustrates a gas separation and control system according to the invention.

FIG. 2 illustrates a gas separation and control system 5 in the IGCC system 100 according to an embodiment of the invention. Steam present in the fuel manifold section 23 may condense and collect at low points. Also, when the injection line 43 is shut down, steam in the line 43 may condense and collect at low points in the segment 45 of the line 43, with syngas entrained therein. The system 5 operates under direction of a controller 180, which actuates numerous valves and switches in response to sensor information, e.g., signals provided by level switches 190, 193, 202, and 204 as the system accumulates a combination of fuel manifold condensates 127 and steam line condensates 142 and then processes these constituents. The controller 180 provides for nitrogen dilution of drain liquids and entrained gases to reduce risks of fire and explosive hazards, and to reduce toxicity from component gases such as carbon monoxide. System pressure and oxygen levels are monitored and regulated during drain collection, during separation of the entrained gases and during release of the constituents. Data obtained from an optional flow meter 160 monitors changes in the collection rate of condensates during operation of the gas combustor 24. Such changes may be indicative of changes in operating characteristics of the system 100.

Generally, the gas separation and control system 5 includes a first drain line 126 connecting a manifold drain 125, positioned in or near the manifold section 23, to a second drain line 137. The line 137 receives a nitrogen injection source 134 and connects with a third drain line 144. The line 144 receives fluid 138, which may be diluted with the nitrogen, and drain fluid 142 from steam injection lines 43 and 45. A fourth drain line 141 connects a steam drain 119 positioned at a low point of the steam injection line 45 to the third drain line 144 into which the drain fluid 145 from both of the drains 119 and 125 is merged prior to entry to a liquid-gas separation tank 140 having a cylindrically shaped upper wall portion 150 where entrained gas is separated from the liquid. After gas removal, the remaining liquid 146 is passed along a fifth drain line 157 for release to a water treatment stage 162.

In the first drain line 126, a drain pot 128 is connected between a first manifold drain valve 130 and the drain 125 to collect condensate. The drain 125 is illustrated as being located at a low point of the fuel manifold section 23. A second manifold drain valve 132 is positioned between the first valve 130 and the second drain line 137 so that, with the valves 130 and 132 in closed positions, a predetermined volume $V_2$ of liquid 127 in segment 131 of the drain line 126, between the valves 130 and 132, can be isolated for transfer to the liquid-gas separation tank 140. A valve 136 is positioned to control injection of nitrogen 135 from the source 134 into the second drain line 137. With the injection of nitrogen 135 the diluted fluid 138 in the drain line 137 predominantly comprises the nitrogen, condensed water and entrained syngas. The diluted fluid 138 flows into the subsequent drain line 144 upon opening of the valve 132. Although illustrated as injecting nitrogen 135 directly into the line 137, the valve 136 may be positioned, as shown in phantom lines, to inject nitrogen 135 from the source 134 into the segment 131 of the drain line.

A pair of valves 118 and 120 is positioned in the steam injection line 43, one valve being on each side of the connection of the line 43 with the fourth drain line 141. The valve 118 is positioned to control flow of the steam 46 into the fuel manifold 23. The valve 120 functions as an isolation valve during system shutdown. A third valve 124 is positioned in the drain line 141 to control movement of drain liquid 142, which collects in the steam line drain 119, along the fourth drain line 141 into the third drain line 144, and then into the tank 140.

After separation of entrained gas in the tank 140, as described below, drain liquid 146 is allowed to exit the tank 140 through a vertical drain tube 153 in the tank 140 and flows along the drain line 157. The liquid 146 initially passes through a drain loop seal 156 and a control valve 158, each positioned to prevent blow-out of liquid from the tank 140. An optional in-line flow meter 160 is positioned to measure the volume of liquid 146 exiting the system prior to entry to a drain collection and holding tank 162. The collection and holding tank 162 may receive liquid drainage from other sources as indicated generally by line 164. Valve 158 controls flow between the drain loop seal 156 and the collection and holding tank 162.

The drain pot 128 includes a first liquid level sensor switch 190 and a second liquid level sensor switch 193 which sense predetermined liquid levels 191 and 195 in the pot 128. The liquid level 191 represents the level of liquid 127 at which the sensor switch 190 sends a signal to the controller 180, which then actuates the first drain valve 130 to an open position. The liquid level 195 represents the level of liquid 127 at which the sensor switch 193 sends a signal to the controller 180, which then actuates the drain valve 130 to a closed position and actuates the second manifold drain valve 132 to an open position.

In this example, the liquid-gas separation tank 140 is cylindrical in shape, having a primarily liquid-containing space 147 in a lower volume portion thereof, and a primarily vapor-containing space 149 in an upper volume portion thereof. The amounts of liquid and gas in the spaces 147 and 149 can vary during operation of the system 100. Liquid level in the tank 140 is controllable with first and second liquid level sensor switches 202 and 204. The first liquid level sensor switch 202 provides a signal to the controller 180 when a maximum desired level of drain liquid resides in the tank 140. The second liquid level sensor switch 204 provides a signal to the controller 180 when a certain minimum level of liquid resides in the tank 140. The level 203 in the tank 140 represents the liquid high level at which the tank drain valve 158 in line 157 may be actuated to an open position by the controller 180 responsive to the level switch 202. The level 205 in the tank 140 represents the liquid low level at which the tank drain valve 158 is actuated to the closed position by the controller 180 responsive to the level switch 204. The tank 140 also includes a pressure transmitter 206 in the vapor space 149 positioned above the liquid high level 203. The controller receives signals from the pressure transmitter 206 to control the maximum gas pressure in the tank 140. The tank 140 also includes an oxygen sensor 208 in the vapor space 149 positioned above the liquid high level 203, providing a signal to the controller 180 to stop movement of drain fluid 127, i.e., by closing the valve 132, from the manifold into the tank 140 when the oxygen content of the tank exceeds a predetermined level. The controller will also stop movement of drain fluid 142 along the drain line 141 by closing the valve 124.

According to one example of system operation, the controller 180 places the valves 118 and 120 in open positions to mix the steam 46 with the syngas 17 produced in the gasifier system 1 and provide the fuel mixture 19 to the fuel manifold section 23 for reaction with the compressed air 22 in the combustor 26. During combustion the mixture 127 of liquid and entrained syngas is allowed to exit the manifold drain 125 and collect in the drain pot 128 by gravity. Once the mixture 127 reaches the level 191 in the drain pot, the controller responds to the signal provided by the sensor switch 190 to open the drain valve 130 and fill the drain line segment 131 with the predetermined, fixed volume $V_2$ of the drain mixture 127. The manifold drain valves 130 and 132 are arranged such that the volume $V_2$ of the segment 131 between the drain valves will be the difference in volume of the mixture 127 in the drain pot between the levels 191 and 195. The volume $V_2$ is selected to handle a maximum condensation rate in the fuel manifold piping 23 during normal operation. The effective drain volume $V_1$ of the drain pot 128 may be multiples of the volume $V_2$ and is adjustable by changing the position of the level switch 190 in the drain pot 128. An exemplary level 191 is illustrated in the drain pot 128.

As the mixture 127 passes through the valve 130 and the volume of this mixture in the drain pot 128 declines to the low level 195, the controller 180 receives a signal generated by the switch 193 in response to the low level 195. Accordingly, the controller actuates closure of the valve 130 and opening of the valve 132. The controller 180 may simultaneously open the valve 136 to dilute the drain mixture 127 with nitrogen 135 as the drain mixture 127 is released through the valve 132. With the valve 132 open, the drain mixture 127 present in the drain line segment 131 is diluted with the nitrogen to form a diluted mixture 138 in the flow line 137. Interlocks provided by the controller 180 prevent the first manifold drain valve 130 and the steam line drain valve 124 from opening when the nitrogen flow valve 136 is open. This prevents nitrogen from flowing into other portions of the system. So long as the liquid level in the tank 140 is below the high-level 203, the valves 124 and 132 can be actuated by the controller 180 to open positions, allowing the diluted mixture 138 and the steam drain liquid 142 to flow by gravity through the line 144 to the drain separation tank 140.

The tank drain valve 158 is actuated to a closed position by the controller 180 while liquid 138 is moved into the tank Once the controller 180 sets both the second manifold drain valve 132 and the steam drain valve 124 in closed positions, the drain valve 158 is opened by the controller 180 so that drain liquid 146 flows into the drain collection tank 162. Interlocks provided by the controller 180 prevent the tank drain valve 158 and the second manifold drain valve 132 from opening when the first manifold drain valve 130 is open.

During operation, the first steam line valve 118 and the second steam line valve 120 are open and the steam line drain valve 124 is closed to direct the flow of steam 46 to the fuel line 18 through the steam injection piping 45. When the steam injection is turned off by closing steam valves 118 and 120, the steam in the piping between valves 118 and 120 condenses. The controller 180 places the steam line drain valve 124 in an open position whenever valve 120 is closed. The drain liquid 142 from the steam drain 119 is delivered by gravity to the drain line 144 when the controller 180 places the steam line drain valve 124 in an open position. Interlocks prevent the valve 124 from opening when the second fuel manifold drain valve 132 or the nitrogen flow valve 136 is open.

The liquid 145, including entrained gases, is introduced to the tank 140 in a tangential manner along the cylindrical-shaped wall portion 150 whereby circular motion along the cylindrical-shaped wall portion facilitates separation of the relatively heavy liquid material from the relatively light gaseous constituent which may include syngas. After making contact with the vessel wall portion 150, the liquids flow downward by gravity to the liquid space 147 of the tank 140 and the gaseous materials occupy the vapor space 149. The vapor space 149 contains mostly inert $N_2$ because the $N_2$ injection in the fuel manifold drain line 137 dilutes the syngas concentration of the drain mixture 138. The vapor space 149 opens to the atmosphere through a vent pipe 209 connected to a flare system 214 via a flare gas line 212. This allows for proper combustion and disposal of gaseous matter containing syngas after it exits the tank 140. The flare gas line 212 may receive disposal gases from other sources as indicated generally by line 210. The position of the liquid level high switch 202 is below the inlet 201 of exhaust tube 209.

A drain tube 153, open to receive fluid in the liquid space 147 of the tank 140, is connected to an external loop seal 156 which in turn is connected to the tank drain valve 158. The valve 158 opens when the liquid level 200 in the tank 140 reaches a level 203, triggering the high liquid level switch 202. When the tank drain valve 158 is open, the liquid 146 is gravitationally routed to a drain collection tank 162. The drain collection tank 162 collects drains from other sources as indicated generally by line 164. The valve 158 closes when the liquid level 200 in the tank 140 reaches a level 205 which triggers the liquid level low switch 204. The position of the liquid level low switch 204 is above the fuel manifold drain line 144 and the inlet 154 of the drain tube 153. The high liquid level 203 and low liquid level 205 in the tank are illustrated in FIG. 2.

The internal drain tube 153 and the loop seal 156 ensure that any syngas which collects in the vapor space 149 of the tank 140 remains separated from the liquid drain 146 and cannot escape to the drain collection tank 162. The height of the loop seal 156 and the size of vent pipe 209 are designed to prevent blowing out of liquid 146 through the loop seal 156 when the drain valve 158 opens, e.g., due to pressure build-up in the drain separation tank 140. Interlocks provided by the controller 180 prevent the tank drain valve 158 from opening when the pressure of the vapor space 149 of the drain separation tank 140, as measured with the tank pressure transmitter 206, exceeds a pre-determined pressure. This arrangement also prevents blow-out of liquid 146 through the loop seal 156.

Interlocks provided by the controller 180 prevent the second fuel manifold drain valve 132 and the steam line drain valve 124 from opening when the oxygen concentration of the vapor space 149, as measured by an oxygen sensor 208 in the tank 140, exceeds a pre-determined concentration. This prevents further passage of entrained syngas to the tank 140 should there be such concentration of oxygen present in the tank 140 as to create an explosive risk. To reduce oxygen concentration under these conditions the controller may be programmed to open the valve 136, injecting additional nitrogen 135 and thereby reducing oxygen concentration. Interlocks are provided by the controller 180 to ensure that the drain valve 158 cannot be in an open position when the steam line drain valve 124 is open. Interlocks also prevent the drain valve 158 from opening when either of the fuel line drain valves 130 or 132 is open.

While one embodiment of our invention has been shown and described herein, the embodiment is provided by way of example only. Numerous variations, changes and substitutions may be made without departing from the invention herein. Accordingly, it is intended that the invention be limited only by the spirit and scope of the appended claims.

The invention claimed is:

1. A power generation system, comprising:
    a gas turbine for generating power;
    a gasifier for generating gaseous fuel;
    a gas combustor configured to receive a combination of steam and the fuel to power the gas turbine;
    a manifold section, including a manifold drain, configured to provide the combination of steam and the fuel to the gas combustor; and
    a drain collection and separation system configured to (i) collect a portion of the steam which has entered into the manifold as a condensed liquid and a portion of the gaseous fuel entrained in the liquid, and (ii) separate the entrained gaseous fuel from the liquid so the separated gaseous fuel can be cycled or disposed of separately from liquid, the drain collection and separation system including a liquid-gas separation tank and a drain line connecting the manifold drain to the liquid-gas separation tank so that the liquid-gas separation tank receives the condensed liquid with entrained gaseous fuel from the manifold, and wherein separation of the entrained gaseous fuel from the liquid occurs in the liquid-gas separation tank based on movement of the liquid along a wall of the tank.

2. The system of claim 1 wherein the gaseous fuel is syngas.

3. The system of claim 1 wherein the gaseous fuel and steam are combined in a fuel line.

4. The system of claim 1 wherein the liquid-gas separation tank includes a cylindrical-shaped wall portion, and the drain collection and separation system is configured to introduce the condensed liquid with entrained gaseous fuel received from the manifold in a tangential manner along the cylindrical-shaped wall portion, whereby circular motion along the cylindrical-shaped wall portion facilitates separation of relatively heavy material of the condensed liquid from relatively light gaseous fuel entrained therein.

5. The system of claim 4 wherein the drain collection and separation system collects mixtures of liquid and gas from multiple sources, and combines the mixtures in the tank for separation of entrained gases to allow gas flow from the tank separate from liquid flow out of the tank.

6. A drain collection and separation system for a power generation system including a gas combustor configured to receive fuel from a manifold to power a gas turbine, comprising:
    a plurality of condensate drain lines and a liquid separation tank, the plurality of drain lines positioned to receive a mixture comprising liquid and gas from at least one source in the power generation system and for routing the mixture to the liquid-gas separation tank, at least one of the drain lines connected to receive condensate comprising condensed steam and gaseous fuel entrained therein from the manifold; and
    a gas dilution system positioned to inject additional gas to the mixture, wherein the liquid-gas separation tank is configured, based on movement of the liquid along a wall of the tank, to separate gas in the mixture from liquid in the mixture and move gas out of the tank separate from movement of liquid out of the tank.

7. The system of claim 6 further including a control system and a plurality of valves to control flow of the mixture and effect receipt and separation of the mixture.

8. The system of 6 including a drain pot positioned between the at least one source and the tank to receive the mixture, wherein movement of the mixture in and out of the drain pot is controllable with a pair of level switches which set a maximum and a minimum liquid level in the pot.

9. The system of 7 wherein the control system receives control signals from a plurality of level switches, a pressure transmitter, and an oxygen sensor, and controls the positions of valves to effect the collection and separation of liquid and gas in the mixture.

* * * * *